UNITED STATES PATENT OFFICE.

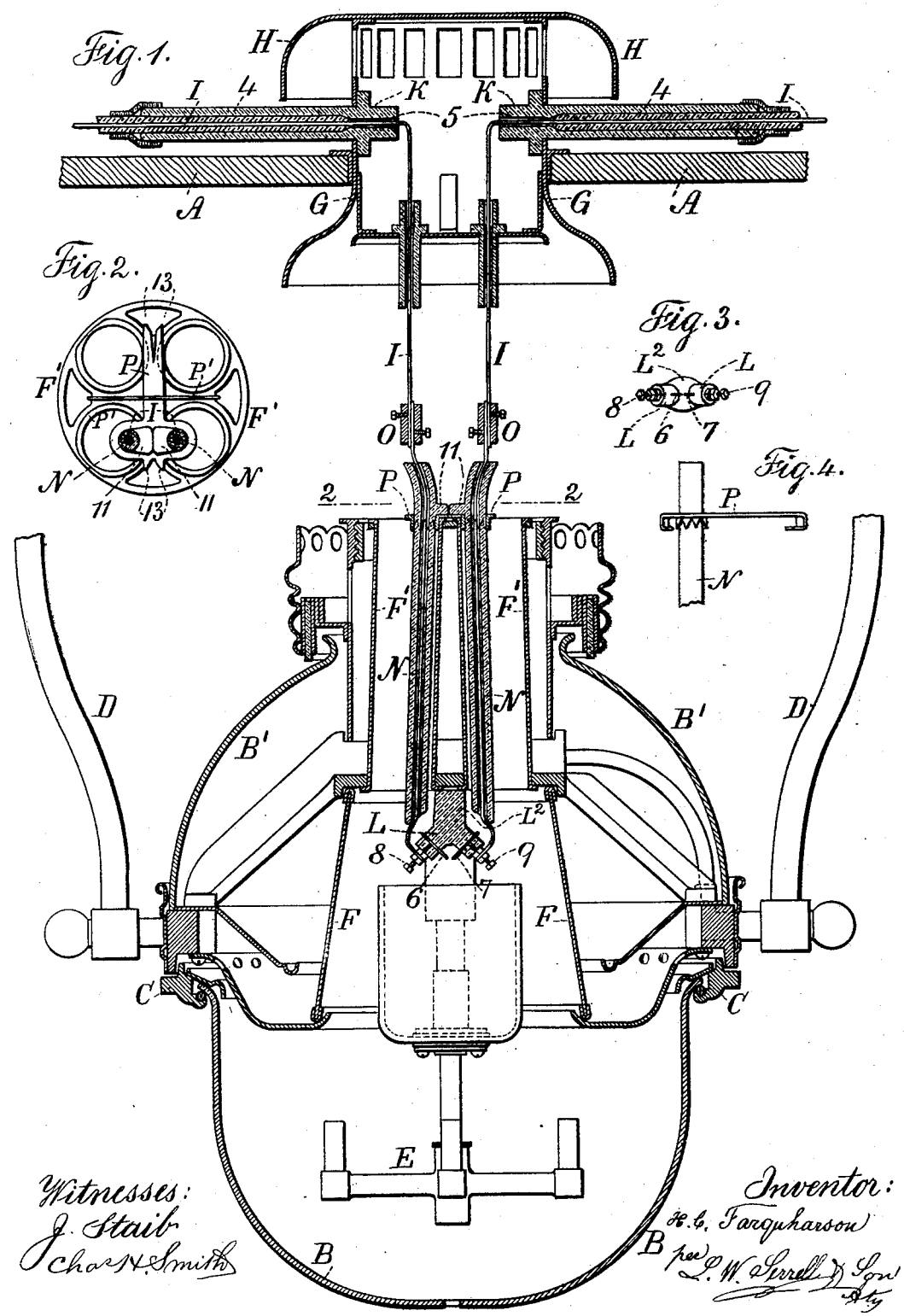

HENRY C. FARQUHARSON, OF NEW YORK, N. Y.

APPARATUS FOR LIGHTING CAR-LAMPS.

SPECIFICATION forming part of Letters Patent No. 627,105, dated June 20, 1899.

Application filed August 13, 1898. Serial No. 688,494. (No model.)

*To all whom it may concern:*

Be it known that I, HENRY C. FARQUHARSON, a citizen of the United States, residing at New York city, in the county and State of New York, have invented an Improvement in Apparatus for Lighting Car-Lamps, of which the following is a specification.

Lamps are usually placed in the upper part of railway-cars, and they have to be lighted and extinguished with rapidity, especially in cases where railroads pass through tunnels, and in cars for city railways especially difficulty has arisen in passing to the lamp and opening the same and applying a match or other lighted device, because the cars are often crowded.

Electricity has been made use of in car-lighting, but the difficulty that has been experienced arises principally from the heat from the flame of the lamp interfering with the insulation of the electric conductors, and in many instances the electric-lighting devices are exposed to a high temperature, and the efforts that have been made to introduce the electric current laterally have either not been successful or have required changes in the lamp itself to allow for the electrical appliances to be so connected as to ignite the gas issuing from the jet.

In my present improvements I am enabled to avoid any changes in the lamp itself and to carry the electric conductors down through the chimney, where they are exposed to a high temperature, and in consequence of the igniting devices being directly in the chimney they reliably act in igniting the gas as it ascends from the burner into the chimney, and I construct the parts in such a way that there is nothing liable to be injured by the heat, and the devices are easily applied upon car-lamps already constructed and in position in the car, so that it is unnecessary even to disconnect the lamp from its place in order to apply the igniting devices.

In the drawings, Figure 1 is a vertical section representing a car-lamp in position. Fig. 2 is a sectional plan view at the line 2 2. Fig. 3 is an inverted plan of the spark-points and their holder, and Fig. 4 is a side view of the friction-plate.

The car-lamp is to be of any desired character, and a portion of the roof of a car is represented at A, and the lamp glass or globe B is hung by a ring C and rods D from the roof A, and the burner is represented at E, and there is a chimney F F' above the burner and inside the lamp-shade B'. These parts are to be of any desired size or character, and in the drawings I have represented a well-known form of car-lamp.

Usually there is a ventilator above the lamp in the form of a pipe or ring G, passing through the roof and provided with an elevated hood or cover H, that allows the products of combustion to pass away, but excludes moisture or rain.

The conductors made use of for supplying an electric current are represented at I, and they are usually allowed to pass along upon the roof of the car, and through the ring or tube G holes are made for the passage of the couplings K, which are of porcelain or similar material, and each coupling is tubular, and the tubular portion 4 of the coupling is sufficiently large for receiving into it the conductor, together with the insulating-covering of such conductor, this covering usually being in the form of a tube or wrapping coated with bituminous material, and before inserting the insulating-covering into the coupling such covering is removed for a sufficient distance for the bare or naked wire to project, and the hole at 5 in the coupling K is sufficiently large for the metallic conductor I to pass freely through it, and such metallic conductor is then bent so as to pass down into the lamp within the car, and it is to be understood that there are two of these metallic conductors and two of the couplings, because it is necessary to have a conductor for the current to pass into the lamp upon one conductor, the other conductor forming the return-circuit, and it is advantageous to make a tight joint between the insulating-covering of the conductor and the coupling K to prevent leakage, and with this object in view the portion 4 of the tubular coupling is sufficiently large to take in the insulating-covering of the conductor, the hole at 5 simply passing the igniting or metallic conductor, and bituminous material should be employed around the insulating material to make a tight joint with the coupling. I remark that the coupling-tubes K are preferably made of porcelain; but ordinary earthenware may be employed, because the same is a non-conductor of electricity and is adapted to withstand a large degree of heat without injury.

The conductors I are brought down through the chimney of the lamp to the desired proximity to the burner E, and there are spark-points 6 and 7 in the desired proximity to the burner, so that the gas that may be turned on to the burners from any desired part of the car will pass through such burners and in ascending within the chimney F come into contact with the spark-points, and an electric current being passed through the conductors at this time gives a spark between the points, so as to ignite the gas.

The spark-point holder is of earthenware or other insulating material, and it is tapped with two holes, through which the wires pass to the spark-points 6 and 7, and these wires are clamped within the holder L by the screws 8 and 9, the spark-points being allowed to project the desired distance for drawing a spark between such points when the gas is ignited.

The wires or conductors I, passing down through the lamp-chimney, which is usually more or less metallic, are liable to become short-circuited by the metal of the chimney or of the lamp with which such wires may come in contact. I therefore use the tubes N, that are of porcelain or similar earthenware and sufficiently large for the conductors to be easily introduced, and these tubes of refractory non-conducting material within the lamp-chimney or otherwise exposed to the direct action of the heat of the lamp or gas burners protect the conductors from the heat and insulate them, especially where they pass down through the metallic chimney of a pendent gas-lamp. With this object in view I find it advantageous to use straight or nearly straight tubes of a length sufficent to pass down through the metallic portion of the lamp-chimney, with the upper ends of the tubes above the top of the metal portion of the lamp-chimney, and the lower ends of the tubes are adjacent to the spark-points. Hence in putting the present improvement upon a lamp already constructed it is only necessary to support the tubes N N so that the spark-points may be in sufficiently-close proximity to the burner, attach the conductors to the screws of the spark-points, each screw preferably having around it a clamping-nut by which to clamp the wire, and then pass the wires up through the earthenware tubes N and connect them with short clamping-couplings O to the lower ends of the wires or conductors that pass through the couplings K, such clamping-couplings O being in the form of short pipes with clamping-screws passing into them and adapted to press against and confine the conductors near their ends, as illustrated in Fig. 1.

In consequence of the tubes N being of earthenware or porcelain they are well adapted to withstand the heat from the gas, and they are also perfect insulators, so that the conductors can be passed through the earthenware tubes and will not need any other nonconducting or insulating material.

It is generally desirable to suspend the conductors in such a manner that they will not be liable to change their position within the lamp under any jar or concussion upon the railway-car. With this object in view each of the tubes N is made with an offset or lateral projection 11, setting above the metal flues F' of the chimney, and the earthenware tubes are held together to keep the projections in position. I have shown the friction-plate P for connecting the tubes N the one to the other at the top of the metal chimney-flues F'. There is no risk of the porcelain tubes becoming misplaced, as they hang down within the metal chimney-flues and are supported by the projections and friction-plate.

I find it advantageous to make use of a metal friction-plate P, the same having two holes in it cut with projecting points that are bent and frictionally engage the exterior surfaces of the earthenware or porcelain tubes and hold them in the desired position, and if necessary the porcelain tubes can be drawn up or forced down through the metal friction-plate in order that the ends of the porcelain or earthenware tubes may come at the right places.

The metal friction-plate P often requires to be held in its proper position in the lamp-chimney, and with this object in view the ends thereof are capable of being turned down to engage the chimney. At 13 I have shown the ends of the metal friction-plate as bent down against the outer sides of the metal tubes of the lamp-chimney, and these ends can be sprung into position or so bent that they engage the metal chimney and hold the earthenware pipes in their proper positions. A wire P' may be passed across the top of the sheet-metal chimney and engage the strip P, so as to prevent the same moving laterally, the ends of the wire being connected with the metal of the chimney.

I find it advantageous to make the earthenware pipes with curved upper ends in order that these ends may be so placed as to diverge and bring the conductors at a sufficient distance apart to prevent any risk of the electric spark jumping from one conductor to the other.

I have represented the spark-points as small wires passing through the spark-point holder, which is made of refractory insulating material, and where these spark-points are straight, but set at an inclination one to the other, they can be adjusted to obtain the proper proximity of one point to the next, and at the same time there is opportunity for the gas mingled with the air to so surround these spark-points that the gas will be ignited by the electric spark.

As before intimated, the present improvement may be applied to any kind of hanging gas-lamp in which the products of combustion ascend through a chimney, and hence the details of construction of the hanging lamp illustrated in the drawings do not require to be elaborated. I, however, remark that the lamp is represented as suspended by tubes or bars passing up to the ceiling, one of which may be used for the supply of gas to the burner.

The spark-point holder may have an upward projection or partition, as seen at $L^2$, Fig. 1, taking against the lower ends of the metal flues of the chimney to determine the proper position of the spark-points in relation to the chimney and to lessen the risk of the electric spark passing to the metal flues.

Where the covered conductor passes into the porcelain tube 4, a wrapping of adhesive tape or a tube of rubber, or both, may be used to make the parts waterproof at this point.

I claim as my invention—

1. The combination with a gas-lamp and means for suspending the same from the ceiling, of electric conductors passing along the ceiling or roof, tubular earthenware couplings receiving the conductors and the insulating-covering thereof, the naked wires extending beyond the conductors and passing down to the lamp through the chimney, earthenware tubes within the lamp-chimney and surrounding the metallic conductors, and spark-points in the electric circuit at the lower ends of the earthenware tubes and above the gas-burner, substantially as set forth.

2. The combination with a suspended gas-lamp having a metallic chimney, of electric conductors passing down through the chimney, spark-points connected with such conductors and above the gas-burner, and earthenware tubes within the chimney and surrounding the electric conductors so as to insulate the same from the metallic chimney and protect such electric conductors, substantially as set forth.

3. The combination with a suspended gas-lamp having a metallic upper portion, of electric conductors passing down through the chimney, spark-points connected with such conductors and above the gas-burner, and earthenware tubes within the chimney and surrounding the electric conductors so as to insulate the same from the metallic portions of the lamp, and projections upon the earthenware tubes by which they are kept in position within the lamp, substantially as set forth.

4. The combination in a suspended lamp having a gas-burner and metallic portions above the same, of electric conductors passing down from above and earthenware tubes surrounding and protecting the conductors, spark-points at the lower ends of the conductors and above the burner and a metallic friction-plate through which the earthenware tubes pass and by which they are suspended, such friction-plate being supported by the chimney, substantially as set forth.

5. The combination in a suspended lamp having a gas-burner and metallic portions above the same, of electric conductors passing down from above and earthenware tubes surrounding and protecting the conductors, spark-points at the lower ends of the conductors and above the burner and a metallic friction-plate through which the earthenware tubes pass and by which they are suspended, such friction-plate being supported by the metal tubes of the chimney, and the ends of the supporting-plate being bent to engage said metallic tubes for holding the parts in position, substantially as set forth.

6. The combination in a suspended lamp having a gas-burner and metallic portions above the same, of electric conductors passing down from above, and earthenware tubes surrounding and protecting the conductors, spark-points at the lower ends of the conductors and above the burner and a metallic friction-plate through which the earthenware tubes pass and by which they are suspended, such friction-plate being supported by the metal tubes of the chimney, and the ends of the supporting-plate being bent to engage said metallic tubes for holding the parts in position, there being projections upon the earthenware tubes coming above the friction-plate and by which the tubes are held in proper position, substantially as set forth.

Signed by me this 10th day of August, 1898.

HENRY C. FARQUHARSON.

Witnesses:
GEO. T. PINCKNEY,
S. T. HAVILAND.